Figures 1, 2, 3:
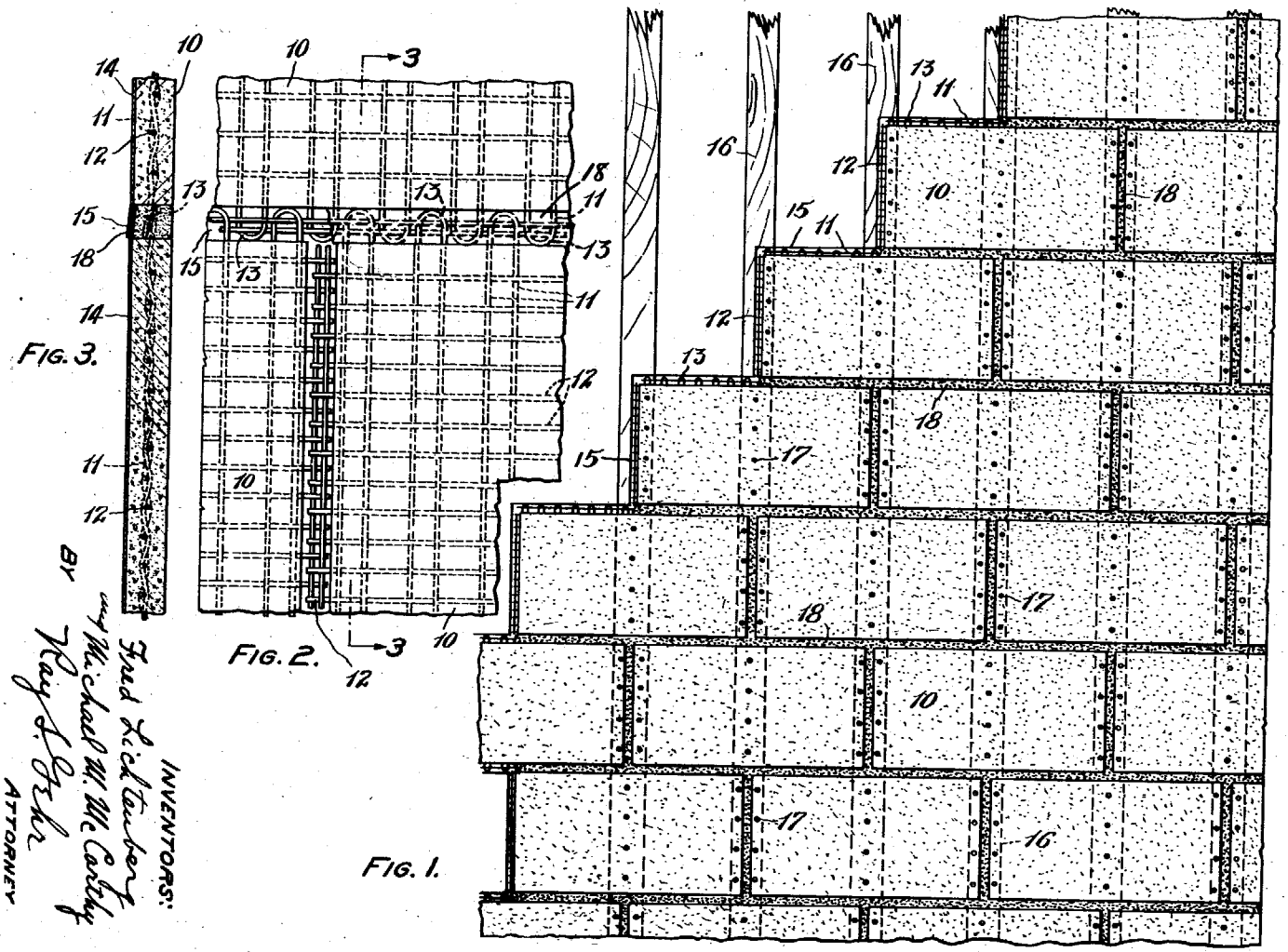

F. LICHTENBERG AND M. M. McCARTHY.

BUILDING CONSTRUCTION.

APPLICATION FILED APR. 22, 1921.

Reissued Aug. 29, 1922.

15,440.

INVENTORS:
Fred Lichtenberg
and Michael M. McCarthy
BY Ray S. Gehr
ATTORNEY

UNITED STATES PATENT OFFICE.

FRED LICHTENBERG AND MICHAEL M. McCARTHY, OF YONKERS, NEW YORK.

BUILDING CONSTRUCTION.

15,440. Specification of Reissued Letters Patent. Reissued Aug. 29, 1922.

Original No. 1,348,018, dated July 27, 1920, Serial No. 330,161, filed October 13, 1919. Application for reissue filed April 22, 1921. Serial No. 463,613.

*To all whom it may concern:*

Be it known that we, FRED LICHTENBERG and MICHAEL M. McCARTHY, citizens of the United States, and residents of Yonkers, in the county of Westchester and State of New York, have invented certain new and useful Improvements in Building Construction, of which the following is a specification.

This invention relates to an improved building construction and to an improved structural unit by the use of which said construction can be produced in the forms of exterior and interior walls, ceilings, roofs and the like.

One object of the invention is to provide a strong monolithic wall, ceiling or roof structure adapted to be built rapidly and at a low cost both as to labor and materials.

A further object of the invention is to produce a structure such as last referred to which is substantially air and moisture tight.

With the above ends in view, other objects of the invention are: (1) To provide structural units or slabs having embedded reinforcing means projecting from their edges and made of cement-like material having physical characteristics adapting it to be penetrated without injury by nails or the like for securing the units to a supporting frame and adapted, when the joints between the individual slabs are pointed up with plastic cement-like material, to form a reinforced, monolithic structure, and (2) to provide such a structural unit with a backing of paper or the like which is substantially impervious to air and moisture and which projects beyond the edges of the units so as to underlie the projecting reinforcing means and form a base or backing for the plastic cement applied to form the joints or bonds between the units.

In addition to the foregoing, this invention comprehends improvements in the details of construction and arrangement of parts, to be hereinafter described and particularly set forth in the appended claims.

In the accompanying drawings in which similar and corresponding parts are designated by the same characters of reference throughout the several views in which they appear, Figure 1 is a view in side elevation illustrating a wall in process of construction in accordance with our invention.

Fig. 2 is a detail view on an enlarged scale illustrating the manner in which the reinforcement of the slabs and joints is formed, some of the bonding cement being omitted to better disclose the reinforcing means, and Fig. 3 is a sectional view taken on the line 3—3 of the preceding figure.

With reference to the drawings, 10 indicates a slab, the same being preferably oblong in configuration and consisting of a material which is plastic when wet and hard when dry. The composition of the material may be that of any of several cement-like materials which are known to have the above-mentioned physical quality permitting the piercing of the materials by nails or the like without cracking or breaking and which for convenience we will refer to as elasticity. Included among these known materials are the compositions of oxy-chloride cement with suitable filling agents or aggregates, comprising sand, gravel and the like and usually some compressible material such as asbestos, wood fibre, or the like. Such oxychloride cement compositions, commonly known as Sorel cement are familiar to those skilled in the art and need not be described in detail as our invention is not dependent on any specific composition. Extending throughout the mass of the slab is a reinforcement of wire fabric which may be relatively coarse, and consists of the vertical strands 11 and the horizontal strands 12. The vertical strands are arranged in pairs and formed with loops 13 at their ends, while the strands 12 are separate and independent and project beyond the vertical ends of the slab as shown in Fig. 2. Applied to the rear face of the slab 10 is a layer of tar paper 14 or the like, the edges of the paper extending beyond the edges of the slab as shown at 15.

In use, the slabs are applied to the studs 16 by means of nails 17, the latter being driven right through the material of the slabs, and into the studs, the nature of the material employed in forming the slabs being such as to stand the insertion of the penetrative elements without breaking or cracking. The slabs are arranged in such a manner as to break the joints as shown in Fig. 1 and where adjacent ends of slabs are applied to a stud, nails are driven through the ends of both slabs into the same stud. It will be noted that the slabs are in spaced relation owing to the projecting ends of the reinforcing elements 11 and 12 and it also will be noted that the slabs are arranged relatively so that the loops 13 at the upper and lower edges of the slab will be in relatively overlapped or staggered relation. It will also be noted that at the vertical edges of the slabs the projecting ends of the horizontal elements 12 are likewise arranged in overlapped or staggered relation. The spaces between the slabs are then filled by means of a suitable binding agent such as mortar as indicated at 18. It will be noted that the projecting edges 15 of the tar paper sections 14 are disposed in overlapping relation thus covering the joints between the slabs, and forming on the inner side a base upon which the mortar joint 18 may be applied. It will be obvious that if the inner surface of the slabs is to be plastered that the tar paper will form a base upon which the plaster may be applied, and that the outer surface of the wall of joined slabs can have a finish coat applied to it, such as plaster in the case of interior walls or ceilings and stucco in the case of exterior walls.

Thus it will be seen that we have provided a novel form of building construction in which the material employed is easily transportable, and which may be cheaply and quickly constructed, and which is at the same time durable and easily applied. It will be apparent that the provision of the tar paper renders the material air tight and damp proof, the overlapping edges of the paper protecting the joint between the slabs. The relation of the reinforcing elements in the manner in which they are projected beyond the edges of the slabs enables a perfect bond to be formed between the slabs making the wall practically a monolithic construction. Other uses and advantages will readily occur to those skilled in the art to which this invention appertains.

While we have illustrated and described our invention with some degree of particularity we realize that in practice various alterations therein may be made. We therefore reserve the right and privilege of changing the form of the details of construction or otherwise altering the arrangement of the correlated parts without departing from the spirit of the invention or the scope of the appended claims.

Having thus described our invention, what we claim as new and desire to secure by United States Letters Patent is:

1. A wall construction comprising vertical spaced studding, a plurality of slabs of elastic material nailed to said studding in broken joint formation with the edges of the slabs in spaced relation, each slab having a reinforcing element molded therein in a form of a sheet of woven wire fabric the edges of which extend beyond the edges of the slab, the vertical strands of said reinforcing element being looped at each end and the horizontal strands straight at each end with the loops of one slab arranged between the loops of the reinforcing elements of the adjacent slabs and the projecting ends of the horizontal strands of the adjacent slabs arranged in overlapping relation to each other, a covering of tar paper upon the inner face of each slab said paper projecting beyond the edges of each slab to a distance corresponding to the extent of projection of the reinforcing element thereof whereby said paper edges of adjacent slabs may be overlapped, and a bond of cement-like material filled in between the slabs.

2. In a building structure, the combination of a frame made of material adapted to be penetrated by nails or the like, slabs of elastic cement-like material secured to said frame by nails or the like driven through the elastic material of the slabs into the frame, said slabs having reinforcing means embedded therein and projecting from their edges, backing sheets on the inner sides of the slabs and projecting from the edges thereof in overlapping relation, and bonded joints between the adjacent slabs formed of cement-like material surrounding the projecting reinforcing means and backed by the overlapping edges of the backing sheets.

3. In a building structure, the combination of a frame made of material adapted to be penetrated by nails or the like, slabs of elastic cement-like material secured to said frame by nails or the like driven through the elastic material of the slabs into the frame, said slabs having reinforcing means embedded therein and projecting from their edges, backing sheets of substantially air and moisture tight paper on the inner sides of the slabs and projecting from the edges thereof in overlapping relation, and bonded joints between the adjacent slabs formed of cement-like material surrounding the projecting reinforcing means and backed by the overlapping edges of the backing sheets.

4. A building unit comprising a slab formed of cement-like material, metallic reinforcing means embedded therein and projecting from the edges thereof, and a sheet of backing material on one side of said slab and projecting from the edges thereof to form a backing for plastic material applied to the projecting reinforcing means, said backing sheet being thin in relation to the thickness of the slab and adapted to overlie the projecting part of a corresponding backing sheet of an adjacent slab when said slabs are assembled to form a wall or the like.

5. A building unit comprising a slab formed of cement-like material, metallic reinforcing means embedded therein and projecting from the edges thereof, and a sheet of backing material substantially impervious to air and moisture on one side of said slab and projecting from the edges thereof to form a backing for plastic material applied to the projecting reinforcing means, said backing sheet being thin in relation to the thickness of the slab and adapted to overlie the projecting part of a corresponding backing sheet of an adjacent slab when said slabs are assembled to form a wall or the like.

6. A building unit comprising a slab formed of cement-like material, metallic reinforcing means embedded in the slab and projecting from its edges between the inner and outer sides thereof, and a sheet of backing material on one side of said slab and projecting from the edges thereof to form a backing for plastic material applied to the projecting reinforcing means.

In testimony whereof, we hereunto affix our signatures.

FRED LICHTENBERG.
MICHAEL M. McCARTHY.